(12) United States Patent
Ji et al.

(10) Patent No.: US 7,750,270 B2
(45) Date of Patent: Jul. 6, 2010

(54) NANOPARTICLE GENERATOR

(75) Inventors: Jun Ho Ji, Namyangju-si (KR); Hyung Soo Noh, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 482 days.

(21) Appl. No.: 11/248,549

(22) Filed: Oct. 13, 2005

(65) Prior Publication Data

US 2006/0140596 A1    Jun. 29, 2006

(30) Foreign Application Priority Data

Dec. 28, 2004  (KR)  ............... 10-2004-0114032
Dec. 29, 2004  (KR)  ............... 10-2004-0115263

(51) Int. Cl.
H05B 3/00    (2006.01)
A01G 13/06   (2006.01)

(52) U.S. Cl. ...................... 219/201; 392/386

(58) Field of Classification Search .............. 219/201; 264/5, 80, 10; 425/6; 392/386
See application file for complete search history.

(56) References Cited

U.S. PATENT DOCUMENTS

| 5,070,232 A | 12/1991 | Martin |
| 5,618,475 A * | 4/1997 | Johnson et al. ........... 264/10 |
| 5,665,277 A | 9/1997 | Johnson et al. |
| 6,381,408 B1 * | 4/2002 | Jaworski et al. .......... 392/392 |
| 7,188,783 B2 * | 3/2007 | Ivey et al. ................ 239/136 |
| 2004/0005269 A1 | 1/2004 | Huang et al. |
| 2004/0101454 A1 | 5/2004 | Johnson et al. |

FOREIGN PATENT DOCUMENTS

| EP | 1 188 801 A | 3/2002 |
| EP | 1 188 801 A1 | 3/2002 |
| JP | 2003-37313 A | 2/2003 |
| KR | 10-0441886 B1 | 10/2003 |
| KR | 10-2004-0067608 A | 7/2004 |
| KR | 10-2004-0068026 A | 7/2004 |
| KR | 10-0444105 B1 | 8/2004 |
| WO | 03/050040 A | 6/2003 |
| WO | WO 03/050040 A1 | 6/2003 |

* cited by examiner

*Primary Examiner*—Sang Y Paik
(74) *Attorney, Agent, or Firm*—Sughrue Mion, PLLC

(57) ABSTRACT

A nanoparticle generator includes a heating unit directly heating material for generating nanoparticles. Due to the structure of the heating unit directly heating the material, a space between the heating unit and the material is eliminated such that a volume of the nanoparticle generator is remarkably reduced and the nanoparticle generator is easily minimized.

10 Claims, 9 Drawing Sheets

NANOPARTICLE GENERATOR

CROSS-REFERENCE TO RELATED APPLICATIONS

This application claims priority from Korean Patent Applications Nos. 2004-114032 and 2004-115263 filed on Dec. 28, 2004 and Dec. 29, 2004, respectively, in the Korean Intellectual Property Office, the disclosures of which are incorporated herein by reference.

BACKGROUND OF THE INVENTION

1. Field of the Invention

Apparatuses consistent with the present invention relate to a nanoparticle generator, and more particularly, to a nanoparticle generator in which volume is remarkably reduced and can be minimized.

2. Description of the Related Art

Generally, nanoparticles are ultra-fine particles of about 1 nm to 100 nm, and have peculiar physical properties distinguished from bulk materials due to surface area geometrically increased due to their particle size.

In other words, the smaller the size of a particle, the higher the ratio of atoms present on the surface of the material due to the increase of surface area. In view of thermodynamics, the energy level of atoms constituting the surface of a material is higher than the energy level of atoms existing inside the material. This is the so called "quantum size effect", and due to this effect, nanomaterials have higher energy levels per unit atom than the energy level per unit atom of bulk materials. Due to the quantum size effect, nanoparticles have peculiar chemical and physical properties such as improved strength or melting point, and high activity when used as a catalyst.

Nanoparticles are manufactured by gas condensation. In particular, nanoparticles are generated by condensing gas generated when a material is heated in low-pressure inert gas or air. A conventional nanoparticle generator using the gas condensation will be described as follows.

The conventional nanoparticle generator includes a main body provided in the form of an electric heating furnace for forming a high-temperature heating atmosphere, a tube passing through an inner side of the main body, a vessel disposed at the central portion to accommodate material for manufacturing nanoparticles, and a heating body installed between the inner wall and the outer wall of the main body to correspond to the position of the vessel.

Thus, in a state of allowing a fluid such as low-pressure inert gas, air, or the like to flow through the tube, when the heating body is heated, the temperature of the inside of the main body is increased to heat the ceramic tube so that the inner temperature of the ceramic tube is increased. Thus, when the temperature of the material is greater than a predetermined temperature, gas is generated due to the vaporization of the material. The generated gas is carried away from the heating body and condensed by the fluid flowing through the tube, thereby generating nanoparticles. The generated nanoparticles are transmitted outside of the main body by the fluid.

Recently, sterilizing materials, such as silver, gold, or the like, or noxious gas absorbents such as carbon, titanium dioxide, or the like are made into nanoparticles such that the sterilizing ability of the materials are remarkably enhanced, and there are various efforts to apply such materials to electric home appliances.

Thus, it can be expected that nanoparticle generators using bactericides and removing noxious gas will be installed in an electric home appliance such that nanoparticles generated from the material are supplied to the indoors, thereby enhancing ability of the electric home appliance to kill bacteria and remove harmful gas.

However, the conventional nanoparticle generator heats the inner space of the tube, in which the material is installed, and a space between the tube and the inner wall of the main body, due to the heating body installed between the outer wall and the inner wall of the main body. Thus, since there must be guaranteed a sufficient space between the heating body and the material, it is difficult to minimize the conventional nanoparticle generator. When the conventional nanoparticle generator is installed in an electric home appliance, the electric home appliance is remarkably increased in size.

SUMMARY OF THE INVENTION

An aspect of the invention is to provide a nanoparticle generator capable of being minimized by remarkably reducing the volume thereof.

In accordance with an aspect of the present invention, there is provided a nanoparticle generator including a main body, a heating unit for heating material accommodated in the main body and for vaporizing the material into gas, a passage, passing through a side of the main body, through which nanoparticles generated by condensing gas vaporized from the material by a fluid are discharged to the outside of the main body, wherein the heating unit directly contacts and heats the material.

The heating unit may include an insulator having a material accommodating room communicating with the passage to accommodate the material and having an opened side facing the passage, and a heater disposed in the insulator to form at least one side of the material accommodating room.

The heater may have a plate shape.

The heater may include a heating part for forming at least one side of the material accommodating room and one of the heating part and the material accommodating room surrounds the other.

Any one of the heating part and the material accommodating room disposed at the inside of the other may have a circular cross-section, and the other disposed at the outside of the one may have a ring-shaped cross-section.

In accordance with another aspect of the present invention, the there is provided a nanoparticle generator including a main body, a heating unit for heating material accommodated in the main body and for vaporizing the material into gas, a passage, passing through a side of the main body, through which nanoparticles generated by condensing gas vaporized from the material with a fluid are discharged to the outside of the main body, wherein the heating unit is disposed below the passage to directly contact and heat the material, the passage crosses the moving direction of gas evaporated from the material, and an insulator is disposed between the upper side of the passage and the main body.

In accordance with another aspect of the present invention, there is provided a nanoparticle generator including a main body, a heating unit for heating material accommodated in the main body and for vaporizing the material into gas, a passage, passing through a side of the main body, through which nanoparticles generated by condensing gas vaporized from the material by a fluid are discharged to the outside of the main body, wherein the heating unit has an open-sided material accommodating room for accommodating the material, a side of the heating unit adjacent to the material accommodating room is positioned in the passages, and the passage is parallel to the direction where the evaporation direction of gas evaporated from the material.

The side of the heating unit disposed in the passage may be spaced apart from the sidewall of the passage.

The material accommodating room may have an opened top and the passage may be disposed in the vertical direction of the main body.

In accordance with another aspect of the present invention, there is provided a nanoparticle generator including a main body for forming a cyclone chamber, and a heating unit for directly contacting and heating material accommodated in the cyclone chamber, wherein nanoparticles generated by condensing gas evaporated from the material by heating of the heating unit with a fluid flowing through the inside of the cyclone chamber are discharged to the outside of the cyclone chamber.

The main body may include an upper cylinder, a lower cone, and an inlet and an outlet of the cyclone chamber respectively formed in a lateral side of the cylinder in the tangential direction and in the upper side of the cylinder, wherein the heating unit has a material accommodating room having an opened side and accommodating the material, and a side of the heating unit adjacent to the material accommodating room is disposed to the lower side of the outlet and spaced apart from the sidewall of the cyclone chamber.

The nanoparticle generator may further include a guide tube disposed in the outlet and extended to the inside of the cyclone chamber adjacent to the heating unit to a predetermined length such that the nanoparticles discharged to the outside of the cyclone chamber are guided.

The material accommodating room may have an opened side facing the outlet.

The heating unit may include an insulator having a material accommodating room communicating with the cyclone chamber to accommodate the material and having an opened side facing the cyclone chamber, and a heater disposed in the insulator to form at least one side of the material accommodating room.

BRIEF DESCRIPTION OF THE DRAWINGS

The above and/or other aspects of the invention will become apparent and more readily appreciated from the following description of the exemplary embodiments, taken in conjunction with the accompanying drawings in which.

DETAILED DESCRIPTION OF THE EXEMPLARY EMBODIMENTS

Hereinafter the exemplary embodiments of the present invention will be described in detail with reference to the accompanying drawings.

A nanoparticle generator according to the exemplary embodiment of the present invention is a device for generating nanoparticles using general gas condensation, namely, by heating material in a predetermined fluid such as low pressure inert gas or air and condensing gas generated from the material.

Figure 1:
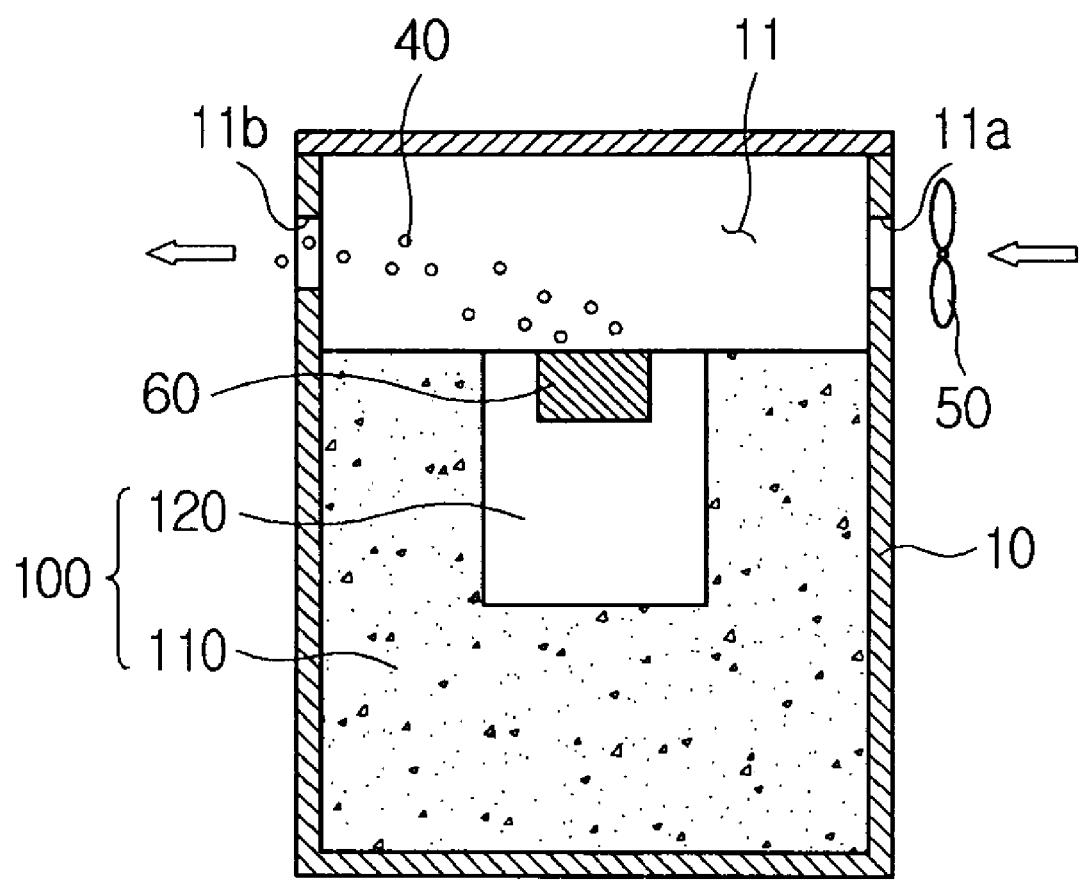
FIG. 1 is a side sectional view illustrating the structure of a nanoparticle generator according to a first exemplary embodiment of the present invention.
Figure 2:
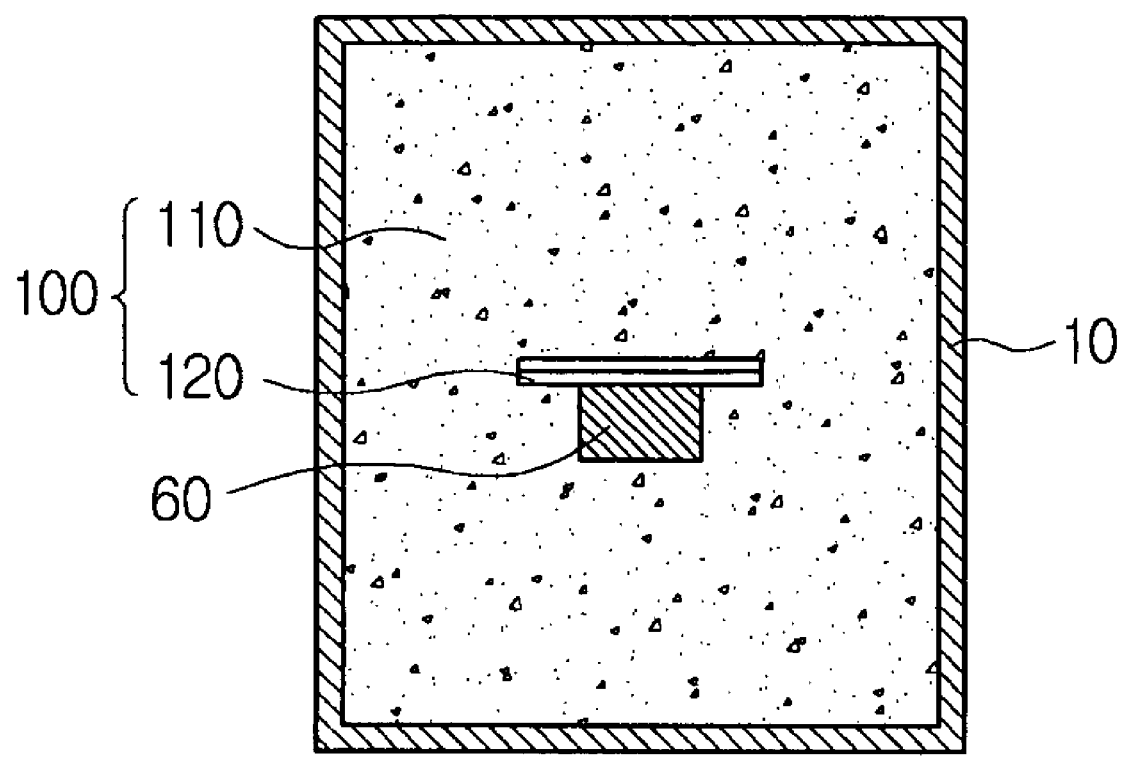
FIG. 2 is a plan sectional view of the nanoparticle generator in FIG. 1.

The nanoparticle generator, as shown in FIGS. 1 and 2, includes a main body 10, a passage 11, disposed in an inner upper side of the main body 10 and passing through the main body 10 from a lateral side of the main body 10 to the opposite lateral side thereof, through which a fluid flows, and a heating unit 100 disposed at a lower side of the passage 11 in the main body 10 to heat a material 60.

At an inlet 11a of the passage 11, a blower fan 50 is installed to generate a blowing force for supplying the fluid to the inside of the passage 11 and transmitting generated nanoparticles 40 out of the main body 10. Alternatively, since the fluid can flow through the passage 11 by adjusting pressure difference between the inlet 11a and an outlet 11b of the passage 11, the blower fan 50 can be omitted.

The heating unit 100 directly contacts and heats the material 60, thereby eliminating a space between the heating unit 100 and the material 60. Thus, the volume of the nanoparticle generator can be remarkably reduced. The heating unit 100 according to a first exemplary embodiment of the present invention enables the volume reduction as follows.

Figure 3:
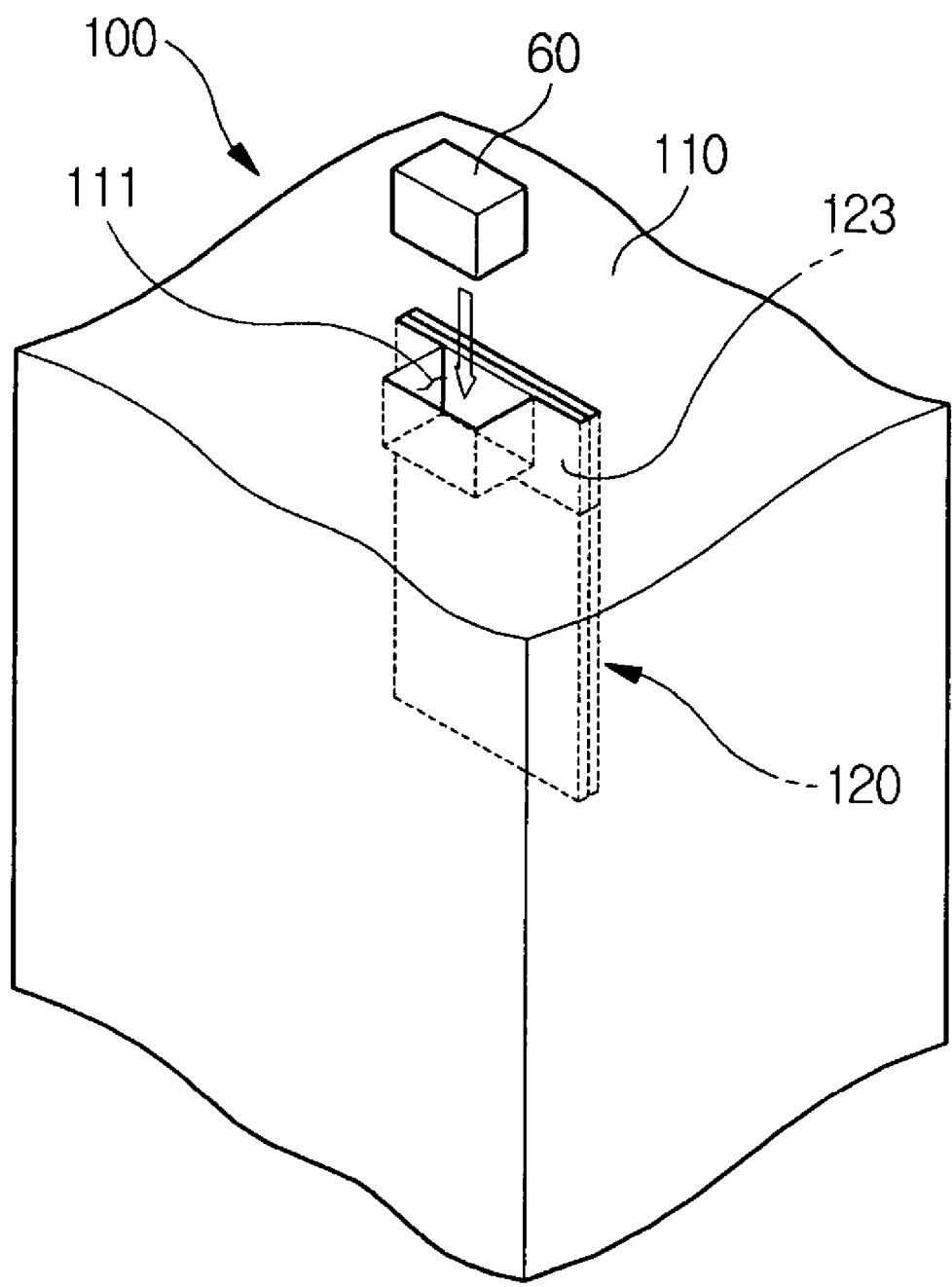
FIG. 3 is a perspective view illustrating a first exemplary embodiment of a heating unit in the nanoparticle generator according to the present invention.
Figure 4:
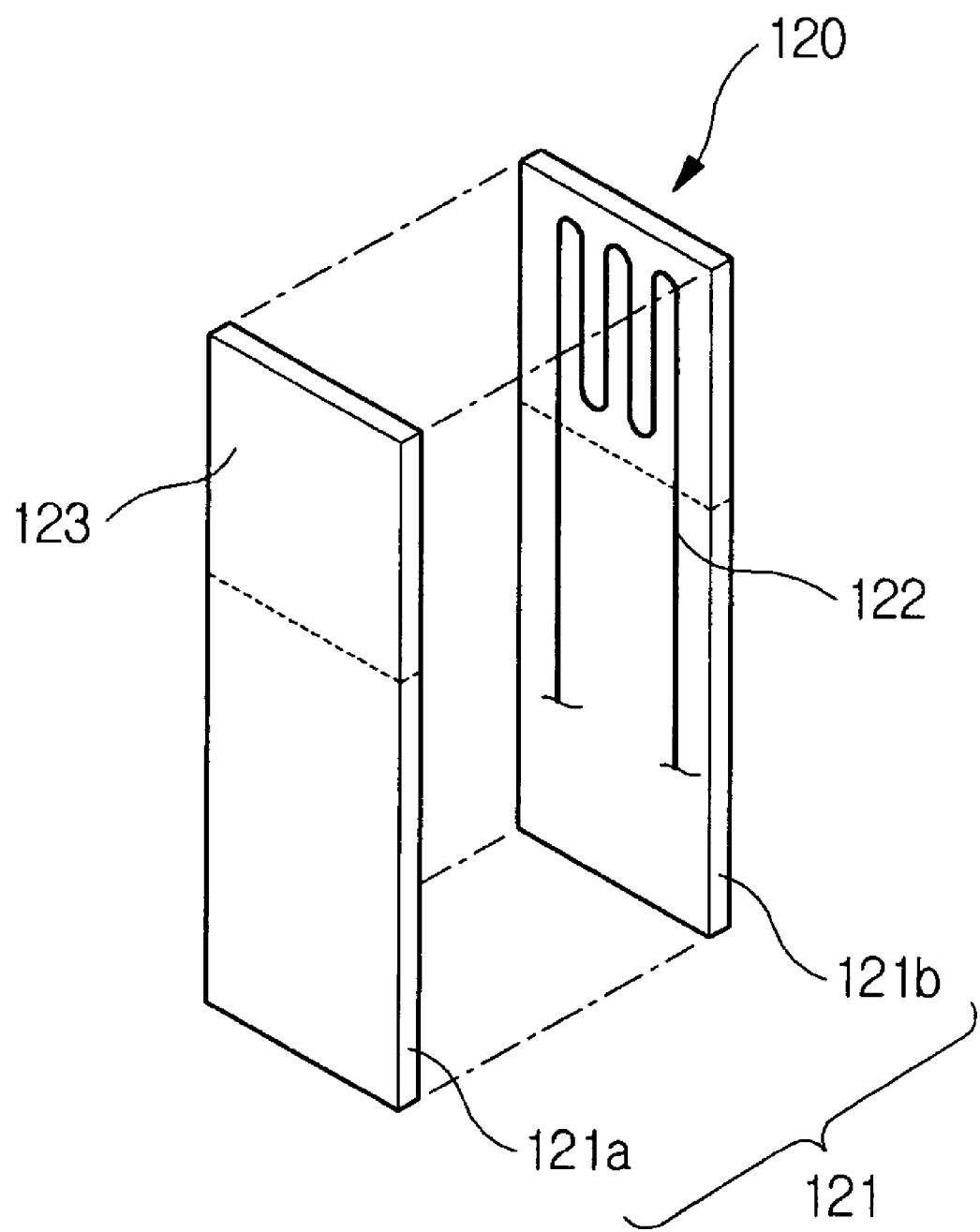
FIG. 4 is an exploded perspective view illustrating a heater of the first exemplary embodiment of the heating unit of the nanoparticle generator according to the present invention.

The heating unit 100 according to the first exemplary embodiment of the present invention, as shown in FIGS. 3 and 4, includes an insulator 110 having a cubic material accommodating room 111 which accommodates the material 60 and is formed in the upper central portion thereof. The material accommodating room 111 has an opened-top communicated with the passage 11.

The heating unit 100 further includes a heater 120 disposed in the insulator 110 to form at least one side of the material accommodating room 111 such that the heating unit 100 can directly heat the material 60 via the heater 120. Here, the insulator 110 prevents heat of the heater 120 from being transmitted and lost to the inner wall of the main body 10 so that heating efficiency of the heating unit 100 is prevented from being deteriorated.

In this exemplary embodiment, the heater 120 includes a plate ceramic heating body 121, and a heating wire 122 made of tungsten wire embedded in the heating body 121 to generate heat when electric power is supplied thereto, so that the heater 120 has a plate shape.

Here, the heating wire 122 is embedded in the heating body 121 to prevent the heating wire 122 from being exposed to the fluid flowing through the passage 11 and from eroding. The heating body 121 is structured such that the heating wire 122 is interposed between a pair of ceramic heating plates 121a and 121b attached to each other. Ends of the heating wire 122 extend to the outside of the heating body 121 and are connected to the external power source (not shown) which supplies electric power.

The heater 120 extends down from the upper central portion thereof to a predetermined distance below the material accommodating room 111 such that the upper side of the heater 120 corresponding to the material accommodating room 111 forms a heating part 123 for forming a side of the material accommodating room 111. The heating wire 122, embedded in the heating body 121 to smoothly heat the material 60 via the heating part 123, has a serpentine shape bent several times and is disposed to the heating part 123. By the arrangement of the heating wire 122 and the heating body 121, the heater 120 can heat the material 60 contacting the heating part 123 to 20 degrees centigrade to 2000 degrees centigrade.

Thus, in the nanoparticle generator according the exemplary embodiment to the present invention, when the blower fan 50 is driven to cause the fluid to flow from the inlet 11a of the passage 11 to the outlet 11b of the passage 11 and the electric power is supplied to the heating wire 122, the heater 120 heats the material 60 so that the upper side of the material 60 exposed to the passage 11 is evaporated. The evaporated atoms of the material 60 collide with molecules of the fluid flowing through the passage 11 and are cooled. During this process, the possibility of collision between the evaporated atoms of the material 60 is increased and the evaporated atoms are conglomerated to generate cores. The generated cores grow such that atoms of the material 60 generate nanoparticles 40. The generated nanoparticles 40 are supplied to the outside of the main body 10 through the outlet 11b of the passage 11 via to the fluid.

Since the space between the heating unit 100 and the material 60 is eliminated due to the structure of the heating unit 100, the volume of the nanoparticle generator according to the present invention can be remarkably reduced and the nanoparticle generator according to the present invention can be minimized. Thus, the nanoparticle generator according to the present invention can be easily installed to electric home appliances.

The nanoparticles 40, generated from the material 60, flow from a high temperature side to a low temperature side due to thermophoresis when the nanoparticles 40 are generated. At that time, since some of the generated nanoparticles 40 flow toward the upper inner wall of the main body 10 having lower temperature than the heating unit 100, an amount of the nanoparticles 40 discharged to the outside of the main body 10 may be reduced.

Figure 5:
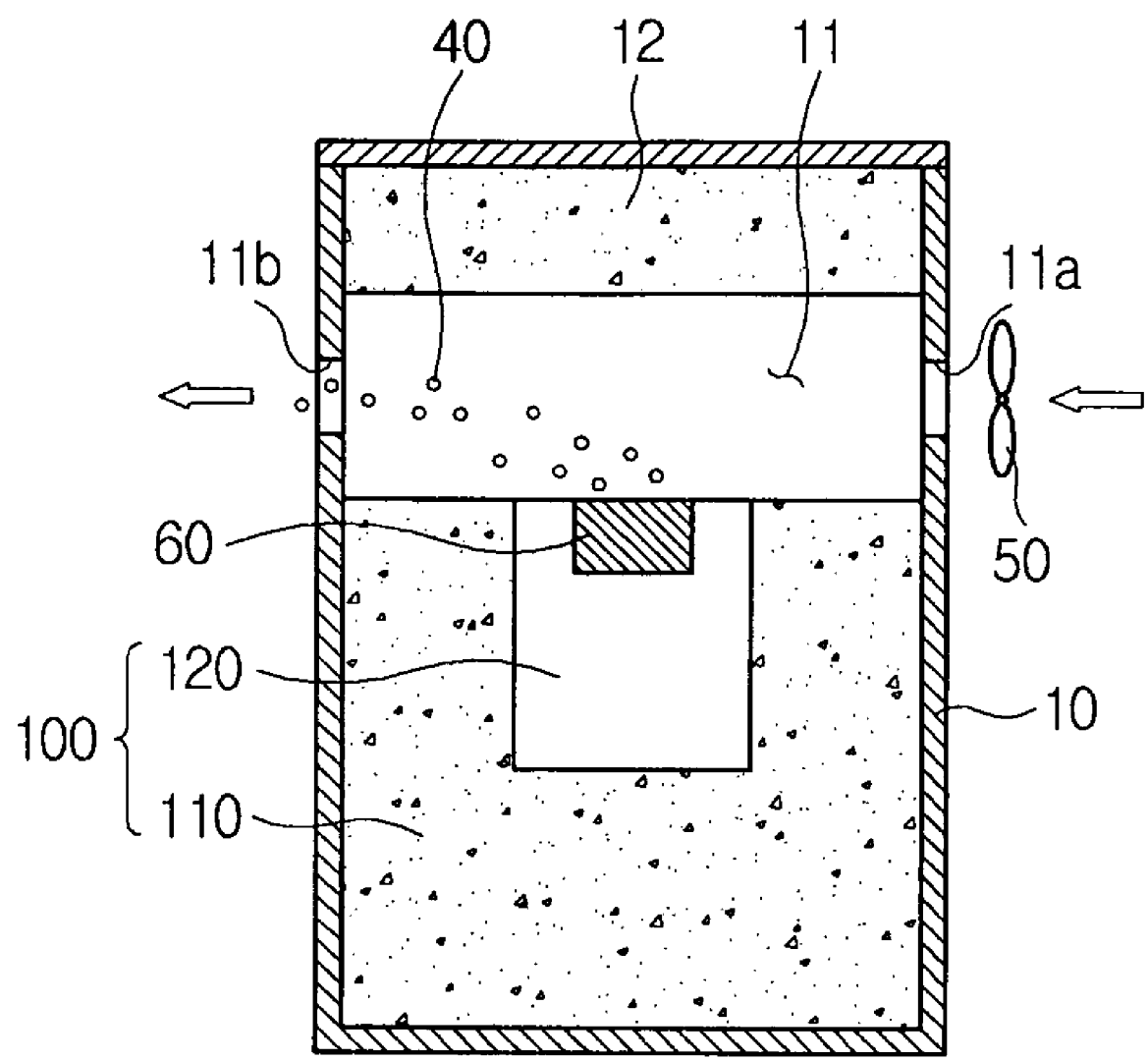
FIG. 5 is a side sectional view illustrating the structure of a nanoparticle generator according to a second exemplary embodiment of the present invention.

According to a second exemplary embodiment of the present invention, as shown in FIG. 5, a nanoparticle generator to overcome the above-mentioned problem includes an insulator 12 disposed between the upper side of the passage 11 opposite to the heating unit 100 and the main body 10. Due to the insulator 12, a temperature difference between the upper side of the passage 11 and the heating unit 100 is reduced so that the generated nanoparticles 40 smoothly flow to the outlet 11b of the passage 11 via the fluid and are discharged to the outside of the main body 10 without loss.

Since the space between the heating unit 100 and the material 60 is eliminated due to the structure of the heating unit 100, the volume of the nanoparticle generator according to the present invention can be remarkably reduced and the nanoparticle generator according to the present invention can be minimized. Thus, the nanoparticle generator according to the present invention can be easily installed to electric home appliances, and the majority of the generated nanoparticles 40 can be discharged to the outside of the main body 10 without loss.

Next, nanoparticle generators according to third and fourth exemplary embodiments of the present invention, for directly heating the material such that the nanoparticle generator can be minimized and for preventing loss of the generated nanoparticles, will be described in detail.

Figure 6:
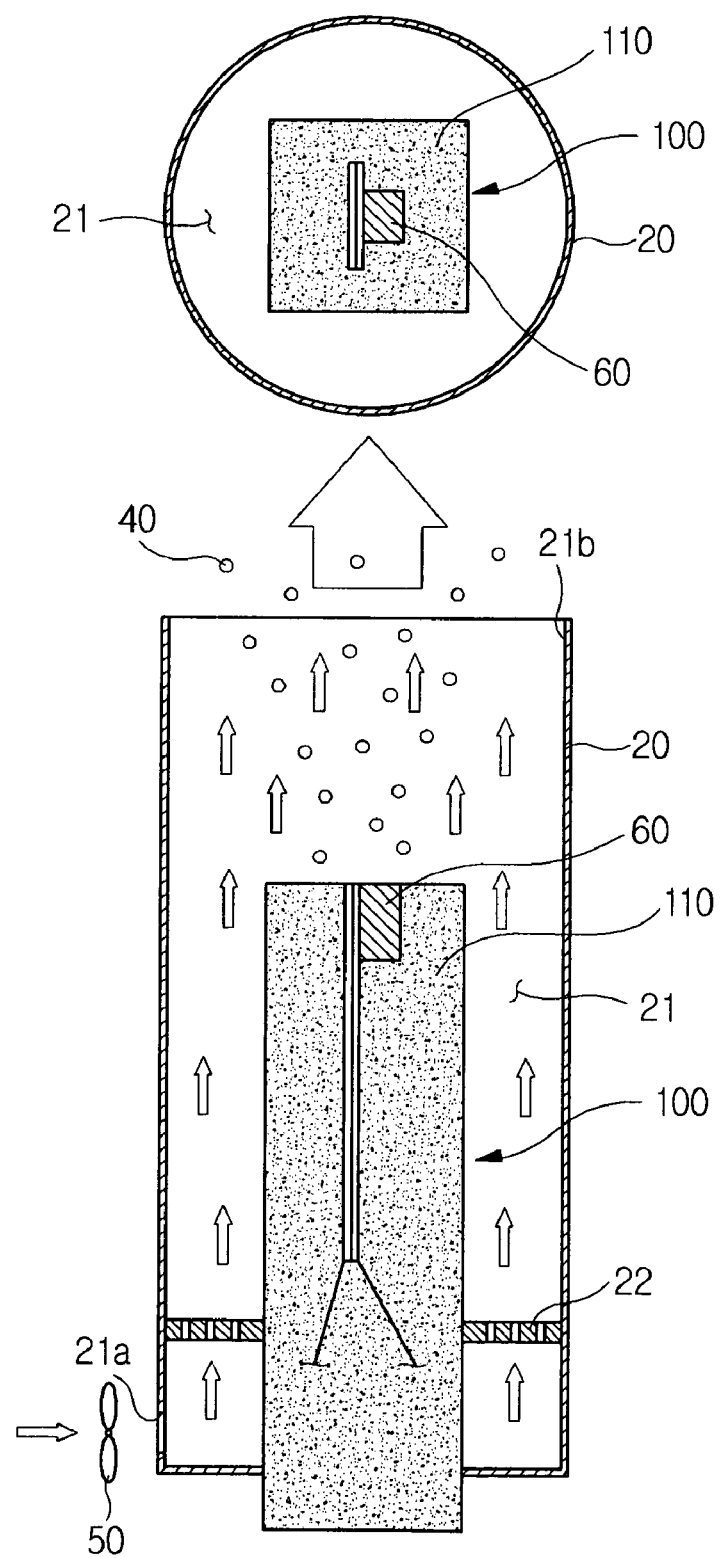
FIG. 6 is a plan sectional view and a side sectional view illustrating the structure of a nanoparticle generator according to a third exemplary embodiment of the present invention.

The nanoparticle generator according to the third exemplary embodiment of the present invention, as shown in FIG. 6, includes the heating unit 100, which is identical to the heating unit 100 in the first and second exemplary embodiments, and an open-topped cylindrical main body 20, wherein a space between the main body 20 and the heating unit 100 serves as a passage 21 for transmitting a fluid.

Here, the opened top of the main body 20 serves as an outlet 21b of the passage 21 and, at a lower side wall of the main body 20, an inlet 21a of the passage 21 is formed. The heating unit 100 is disposed in the passage 21 such that an upper side having the material 60 is spaced apart from the sidewall of the passage 21.

Thus, in the nanoparticle generator according to the third exemplary embodiment of the present invention, the generated nanoparticles 40 are prevented from flowing toward the inner wall of the main body 20 having a temperature lower than that of the heating unit 100, i.e. the sidewall of the passage 21 by the fluid flowing through the outside of the heating unit 100. Moreover, since gas is evaporated from the material 60 in the direction parallel to the flow direction of the fluid such that the generated nanoparticles 40 are smoothly guided to the outlet 21b of the passage 21, loss of the nanoparticles 40 can be effectively prevented without using the insulator in the second exemplary embodiment. In this structure, the fluid flowing between the heating unit 100 and the sidewall of the passage 21 forms a fluid layer between the heating unit 100 and the sidewall of the passage 21, and the fluid layer forms an insulator layer in association with the insulator 110 for forming the outer side of the heating unit 100, so that heating efficiency of the heater 120 is also improved.

Further, between the passage 21 adjacent to the inlet 21a and the heating unit 100, a filter 22 is provided for filtering foreign matter contained in the fluid flowing through the passage 21 so that impurities are prevented from mixing with the nanoparticles 40 discharged out of the main body 20.

Figure 7:
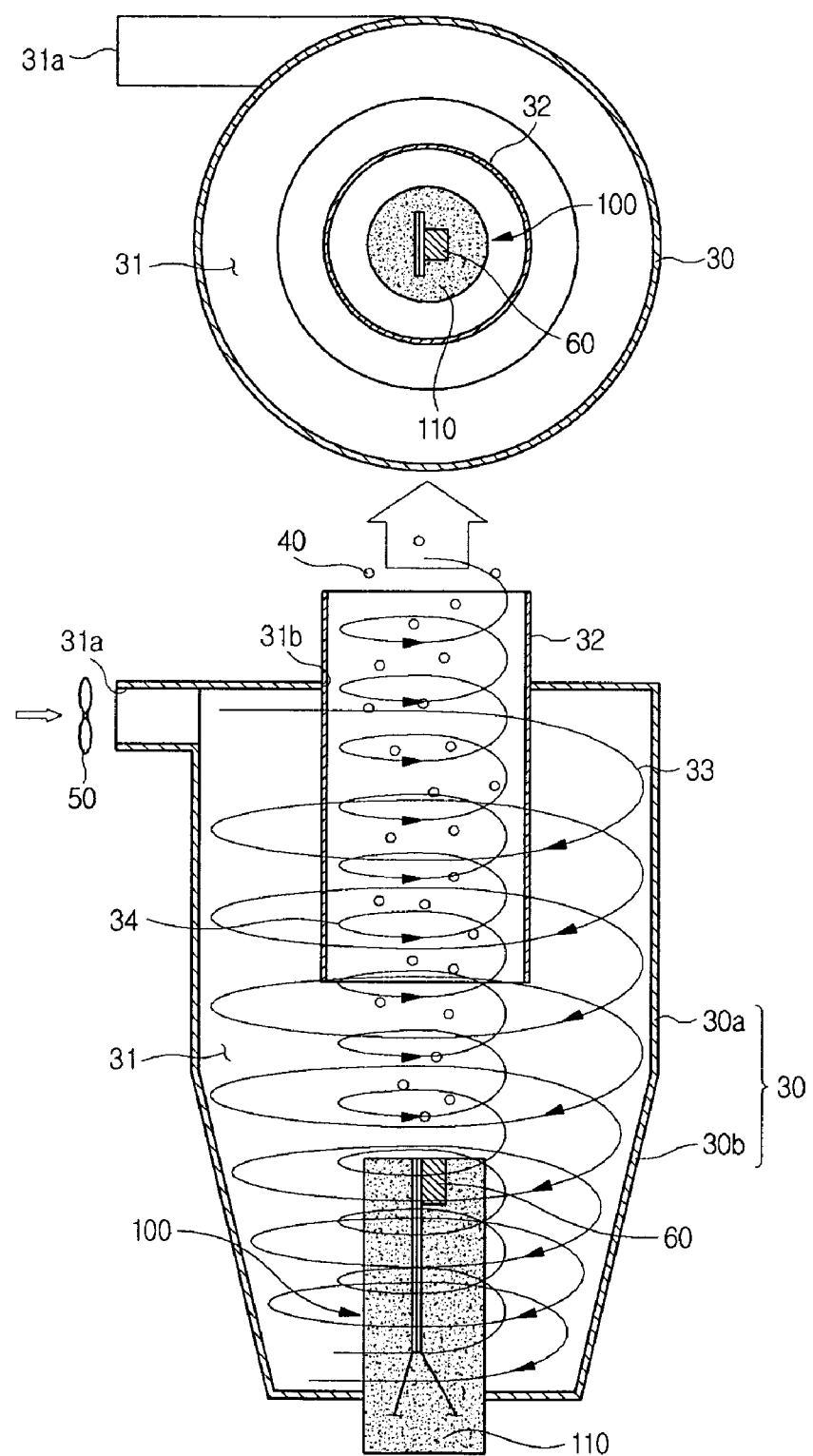
FIG. 7 is a plan sectional view and a side sectional view illustrating the structure of a nanoparticle generator according to a fourth exemplary embodiment of the present invention.

A nanoparticle generator according to the fourth exemplary embodiment of the present invention, as shown in FIG. 7, generates and discharges the nanoparticles using a cyclone.

In detail, the nanoparticle generator according to the fourth exemplary embodiment of the present invention includes a main body 30 having an upper cylinder 30a and a lower cone 30b which form a cyclone chamber 31 in the main body 30. An inlet 31a and an outlet 31b of the cyclone chamber 31 are respectively formed at the upper lateral side in the tangential direction and the upper central portion of the upper cylinder 30a.

In the outlet 31b, a guide tube 32 for guiding the nanoparticles 40 discharged from the cyclone chamber 31 to the outside of the main body 30 is installed and has a lower side which extend a predetermined distance into the cyclone chamber 31. The heating unit 100 is positioned such that the material 60 is disposed below the guide tube 32 in the cone 30b and is spaced apart from the sidewall of the cyclone chamber 31.

In the nanoparticle generator having the above-mentioned structure, when the fluid enters the cyclone chamber 31 through the inlet 31a, the fluid forms an outer swirl 33 swirling along the inner wall of the cyclone chamber 31 and flowing to the lower side of the cyclone chamber 31, and an inner swirl 34 swirling from the inside to the upper side of the outer swirl 33 and flowing toward to the outlet 31b. The nanoparticles 40 generated at the upper side of the material accommodating room 111 are guided to the guide tube 32 by the inner swirl 34 and are discharged to the outside of the main body 30.

Thus, in the nanoparticle generator according to the fourth exemplary embodiment of the present invention, the generated nanoparticles 40 are prevented from flowing toward the inner wall of the main body 30 having lower temperature than the heating unit 100, namely, the sidewall of the cyclone chamber 31 by the outer swirl 33. Although a predetermined quantity of the generated nanoparticles 40 is mixed with the outer swirl 33, the mixed nanoparticles 40 are guided again by the inner swirl 34 and are discharged to the outside of the main body 30. Thus, loss of the generated nanoparticles 40 is prevented. In the fourth exemplary embodiment, the outer swirl 33 and the inner swirl 34 form a predetermined fluid layer between the heating unit 100 and the cyclone chamber 31, and the fluid layer forms an insulating layer in association with the insulator 110 so that heating efficiency of the heater 120 is also enhanced. The heating unit 100 has a cylindrical shape to reduce the interference between the inner swirl 34 and the outer surface of the heating unit 100.

In the nanoparticle generators according to the above-described exemplary embodiments of the present invention, the heating unit 100 directly heating the material may have a structure different from the structures described above.

Figure 8:
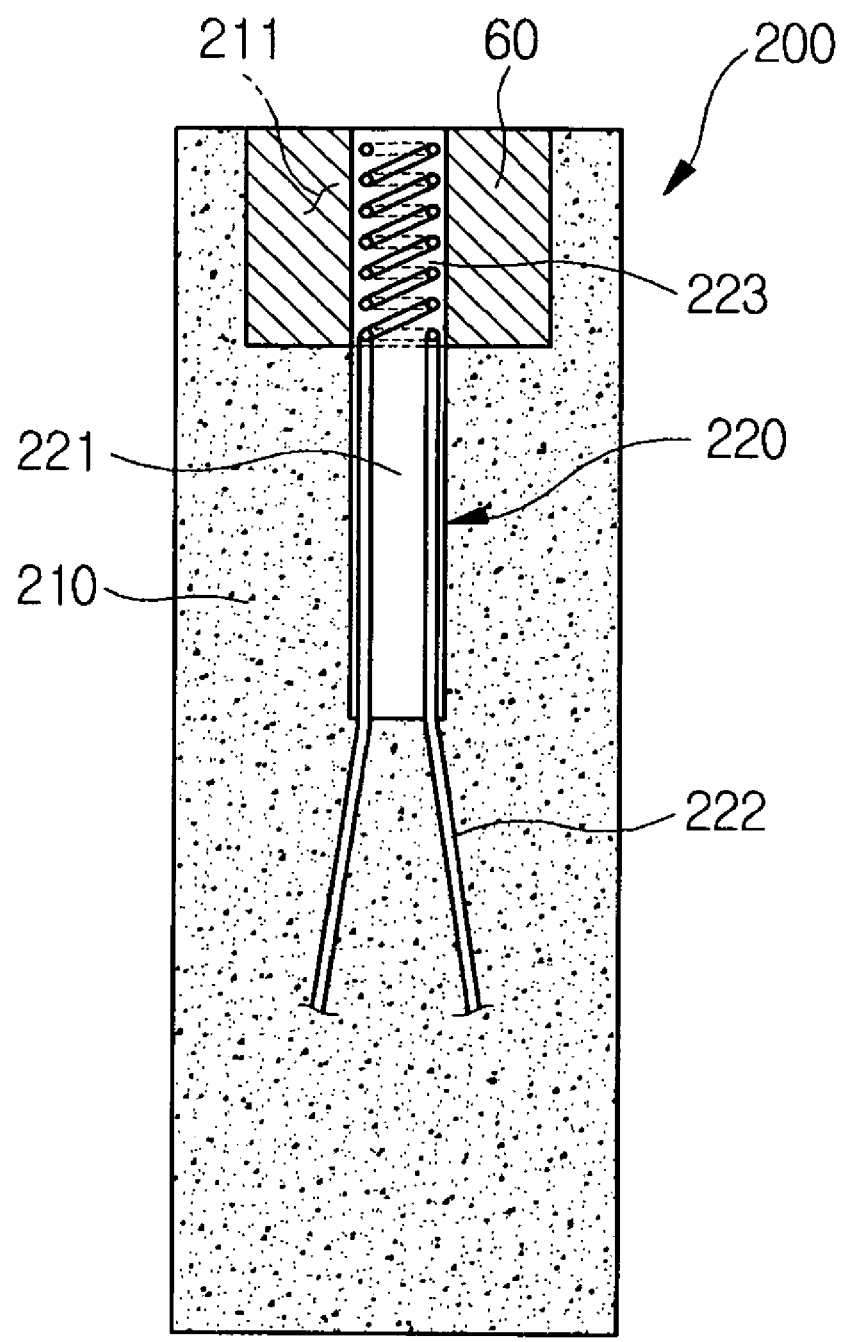
FIG. 8 is a side sectional view illustrating a second exemplary embodiment of a heating unit in the nanoparticle generator according to the present invention.

For example, as shown in FIG. 8 illustrating a second exemplary embodiment of the heating unit of the nanoparticle generator of the present invention, a heating unit 200 includes an open-topped material accommodating room 211 formed in an upper inner central portion of an insulator 210 and having a ring-shaped horizontal cross-section, and a heater 220 having a rod-shaped heating body 221 and a heating wire 222 embedded in the heating body 221 such that a heating part 223 directly heating the material 60 is disposed at an upper side of the heater 220 at the inner central portion of the material accommodating room 211 and has a circular horizontal cross-section.

Thus, in the second exemplary embodiment, the heating part 223 of the heater 220 forms the inner sides of the material accommodating room 211, thereby directly heating the material 60 disposed in the material accommodating room 211.

The heating wire 222 is positioned adjacent to the inner surface of the heating body 221 and is wound in the heating body 221 in the form of a cylinder such that the heating wire 222 is concentrated to the heating body 221 adjacent to the heating part 223 to effectively transmit heat to the material 60.

Figure 9:
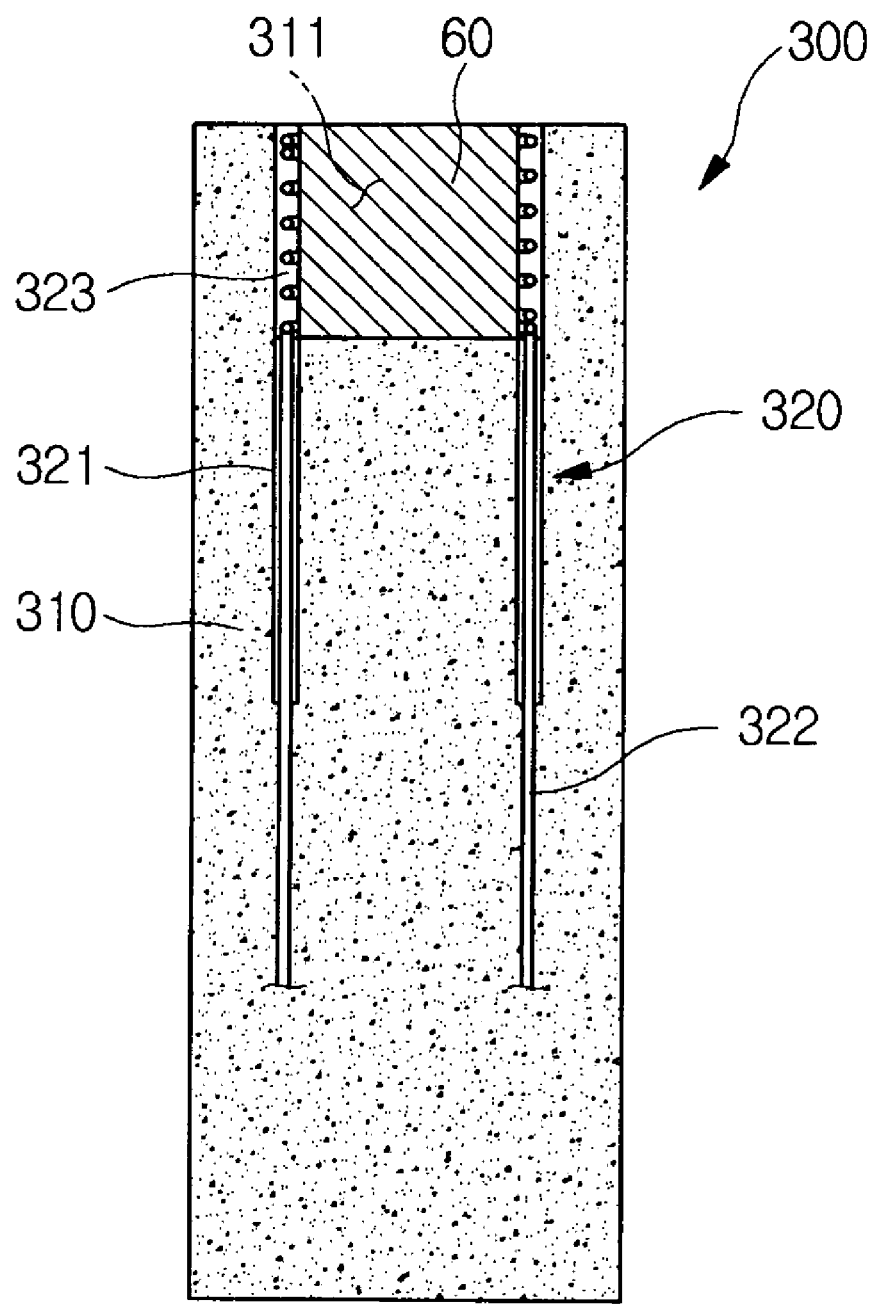
FIG. 9 is a side sectional view illustrating a third exemplary embodiment of a heating unit in the nanoparticle generator according to the present invention.

On the contrary, a heating unit 300 according to the third exemplary embodiment of the present invention, as shown in FIG. 9, includes a material accommodating room 311 formed in the upper inner central portion of an insulator 310 and having a circular horizontal cross-section, and a heater 320 having a cylindrical heating body 321 and a heating wire 322 embedded in the heating body 321 such that a heating part 323 directly heating the material 60 is disposed outside of the material accommodating room 311 and has a ring-shaped horizontal cross-section.

Thus, in the third exemplary embodiment, the heating part 323 of the heater 320 forms the outer side of the material accommodating room 311, thereby directly heating the material 60 disposed in the material accommodating room 311.

The heating wire 322 is wound between the inner side and the outer side of the heating body 321 in the form of a cylinder such that such that the heating wire 322 is concentrated to the heating body 321 adjacent to the heating part 323.

For reference, in the nanoparticle generator including the heating unit 200 or 300 according to the second or third exemplary embodiment of the present invention, the nanoparticles are generated in the same way as in the nanoparticle generator having the heating unit 100 according to the first exemplary embodiment of the present invention, and therefore the description will be omitted.

As described above, in the nanoparticle generator according to the present invention, due to the heating unit for directly heating material for generating nanoparticles, a space between the heating unit and the material is eliminated. Thus, volume of the nanoparticle generator is remarkably reduced, so that the nanoparticle generator is easily minimized and is easily installed to electric home appliances. Moreover, the majority of nanoparticles generated in the main body are discharged to the outside of the main body without loss.

Although a few exemplary embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A nanoparticle generator comprising:
   a main body;
   a heating unit which heats a material accommodated in the main body to vaporize the material into a gas;
   a passage, passing through a side of the main body, through which nanoparticles generated by condensing the gas vaporized from the material with a fluid are discharged out of the main body; and
   a blower fan to generate a blowing force for supplying the fluid to the inside of the passage and transmitting the generated nanoparticles out of the main body,
   wherein the heating unit directly contacts and heats the material and includes a thermal insulator which has a material accommodating room communicating with the passage to accommodate the material.

2. The nanoparticle generator according to claim 1, wherein the heating unit comprises:
   a heater which is disposed in the insulator to form at least one side of the material accommodating room,
   wherein the accommodating room has an opened side facing the passage.

3. The nanoparticle generator according to claim 2, wherein the heater has a plate shape.

4. The nanoparticle generator according to claim 2, wherein the heater comprises a heating part which forms at least one side of the material accommodating room, and one of the heating part and the material accommodating room surrounds the other one of the heating part and the material accommodating room.

5. The nanoparticle generator according to claim 4, wherein one of the heating part and the material accommodating room disposed at the inside of the other one of the heating part and the material accommodating room has a circular cross-section, and the other one of the heating part and the material accommodating room disposed at the outside of the one of the heating part and the material accommodating room has a ring-shaped cross-section.

6. A nanoparticle generator comprising:
   a main body;
   a heating unit which heats a material accommodated in the main body to vaporize the material into a gas;

a passage, passing through a side of the main body, through which nanoparticles generated by condensing the gas vaporized from the material with a fluid are discharged out of the main body; and a blower fan to generate a blowing force for supplying the fluid to the inside of the passage and transmitting the generated nanoparticles out of the main body, wherein the heating unit is disposed below the passage to directly contact and heat the material, the passage crosses a moving direction of the gas vaporized from the material, and a thermal insulator is disposed between an upper side of the passage and the main body.

7. The nanoparticle generator according to claim 6, wherein the heating unit comprises:

an insulator which has a material accommodating room communicating with the passage to accommodate the material and having an opened side facing the passage; and a heater which is disposed in the insulator to form at least one side of the material accommodating room.

8. A nanoparticle generator comprising:

a main body;

a heating unit which heats a material accommodated in the main body to vaporize the material into a gas;

a passage, passing through a side of the main body, through which nanoparticles generated by condensing the gas vaporized from the material by a fluid are discharged out of the main body; and a blower fan to generate a blowing force for supplying the fluid to the inside of the passage and transmitting the generated nanoparticles out of the main body, wherein the heating unit has an open-sided material accommodating room for accommodating the material, a side of the heating unit adjacent to the material accommodating room is positioned in the passage, and the passage is parallel to a moving direction of the gas vaporized from the material wherein the heating unit comprises:

a thermal insulator which has the material accommodating room; and a heater which is disposed in the insulator to form at least one side of the material accommodating room.

9. The nanoparticle generator according to claim 8, wherein the side of the heating unit disposed in the passage is spaced apart from a sidewall of the passage.

10. The nanoparticle generator according to claim 8, wherein the material accommodating room has an opened top and the passage is disposed in a vertical direction of the main body.

* * * * *